US012267368B1

(12) United States Patent
Goberman et al.

(10) Patent No.: US 12,267,368 B1
(45) Date of Patent: Apr. 1, 2025

(54) REAL-TIME CLOUD BASED MULTI-DIMENSIONAL USER ENTITLEMENT SYSTEM

(71) Applicant: Morgan Stanley Services Group Inc., New York, NY (US)

(72) Inventors: Boris Goberman, Fair Lawn, NJ (US); Prashant Suri, Brossard (CA); Nandhakumar Chellamuthu, Montreal (CA); James McGuire, New York, NY (US); Robert Gordonoff, Edgewater, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/471,415

(22) Filed: Sep. 21, 2023

(51) Int. Cl.
*H04L 9/40* (2022.01)

(52) U.S. Cl.
CPC ............ *H04L 63/20* (2013.01); *H04L 63/104* (2013.01); *H04L 63/105* (2013.01)

(58) Field of Classification Search
CPC ...... H04L 63/20; H04L 63/104; H04L 63/105
See application file for complete search history.

(56) References Cited

U.S. PATENT DOCUMENTS

| | | | | |
|---|---|---|---|---|
| 7,774,365 B2 * | 8/2010 | Oxenstierna | ........ | G06F 21/6218 709/204 |
| 8,490,152 B2 * | 7/2013 | Staiman | ............. | G06Q 10/0631 726/1 |
| 8,966,652 B2 * | 2/2015 | Brown | ....................... | G06F 8/60 726/28 |
| 9,325,739 B1 * | 4/2016 | Roth | .................... | H04L 41/0893 |
| 9,521,215 B1 * | 12/2016 | Angert | ..................... | H04L 67/60 |
| 9,846,847 B2 | 12/2017 | Rutter et al. | | |

(Continued)

OTHER PUBLICATIONS

Buyya, Rajkumar, Saurabh Kumar Garg, and Rodrigo N. Calheiros. "SLA-oriented resource provisioning for cloud computing: Challenges, architecture, and solutions." 2011 international conference on cloud and service computing. IEEE, 2011. (Year: 2011).*

(Continued)

*Primary Examiner* — Jung W Kim
*Assistant Examiner* — Sameera Wickramasuriya
(74) *Attorney, Agent, or Firm* — K&L Gates LLP

(57) ABSTRACT

Systems and methods provide advanced user entitlement management for enterprise networks. System can comprise a local network and a central transactional database, such that the local network is configured to generate a plurality of multi-dimensional user entitlements on the local network, where each multi-dimensional user entitlement of the plurality of multi-dimensional user entitlements is capable of being defined by dimensional restrictions or coverages; store the plurality of multi-dimensional user entitlements in a central admin database on the local network; and push the plurality of multi-dimensional entitlements to an active directory database on a cloud network coupled to the local network; the cloud network comprising: an RTAC server configured to receive an entitlement query from a querying app such as at least one application hosted on the cloud network or a third party application connected via a SCIM interface, and fetch the plurality of multi-dimensional user entitlements.

16 Claims, 7 Drawing Sheets

(56) References Cited

U.S. PATENT DOCUMENTS

| | | | |
|---|---|---|---|
| 10,505,941 B2 | 12/2019 | Vats et al. | |
| 10,580,100 B2* | 3/2020 | Pierce | H04L 69/40 |
| 10,728,620 B2* | 7/2020 | Witkowski | H04N 21/6405 |
| 10,791,087 B2 | 9/2020 | Medam et al. | |
| 10,956,224 B1 | 3/2021 | McLaughlin et al. | |
| 11,252,160 B1* | 2/2022 | Pritchard | H04L 67/34 |
| 11,281,442 B1* | 3/2022 | Tal | H04L 67/51 |
| 11,368,492 B1* | 6/2022 | Engers | H04L 41/0894 |
| 2010/0325161 A1 | 12/2010 | Rutter et al. | |
| 2011/0162034 A1* | 6/2011 | Nagaratnam | G06F 21/604 |
| | | | 726/4 |
| 2011/0213691 A1* | 9/2011 | Ferris | G06F 9/44505 |
| | | | 718/1 |
| 2011/0225467 A1 | 9/2011 | Betzler et al. | |
| 2012/0042354 A1* | 2/2012 | Vitiello | G06Q 10/06 |
| | | | 726/1 |
| 2012/0079556 A1 | 3/2012 | Wahl | |
| 2012/0102489 A1* | 4/2012 | Staiman | G06Q 10/0631 |
| | | | 718/1 |
| 2013/0097223 A1 | 4/2013 | Mishkevich et al. | |
| 2014/0289391 A1 | 9/2014 | Balaji et al. | |
| 2015/0074007 A1* | 3/2015 | Gabriel | G06Q 10/00 |
| | | | 705/311 |
| 2015/0200953 A1* | 7/2015 | Vidhun | H04L 63/108 |
| | | | 726/1 |
| 2016/0057107 A1* | 2/2016 | Call | H04L 63/02 |
| | | | 726/11 |
| 2016/0098876 A1* | 4/2016 | Oz | G07C 5/008 |
| | | | 340/5.61 |
| 2016/0142399 A1* | 5/2016 | Pace | G06F 21/41 |
| | | | 726/4 |
| 2016/0315965 A1 | 10/2016 | Sastry et al. | |
| 2017/0041347 A1* | 2/2017 | Nagaratnam | H04L 63/0227 |
| 2017/0149835 A1* | 5/2017 | Mitevski | H04L 67/141 |
| 2017/0295156 A1* | 10/2017 | Spencer | H04L 63/08 |
| 2019/0253427 A1* | 8/2019 | Kling | G06F 3/0622 |
| 2020/0364078 A1* | 11/2020 | Potter | G06F 21/53 |
| 2021/0174302 A1 | 6/2021 | Brahmbhatt et al. | |
| 2022/0179985 A1* | 6/2022 | Veeramachaneni | |
| | | | G06F 21/6218 |

OTHER PUBLICATIONS

A. Kochut et al., "Evolution of the IBM Cloud: Enabling an enterprise cloud services ecosystem," in IBM Journal of Research and Development, vol. 55, No. 6, pp. 7:1-7:13, Nov.-Dec. 2011 (Year: 2011).*

* cited by examiner

REAL-TIME CLOUD BASED MULTI-DIMENSIONAL USER ENTITLEMENT SYSTEM

BACKGROUND

Enterprise networks are deployed ever more frequently by corporations and large organizations. As a consequence of ever more extensive and complex enterprise networks, adoption of user entitlement management systems to manage users and devices on these enterprise networks has also increased. These user entitlement management systems determine which users are entitled to undertake what activity on resources in the enterprise network.

SUMMARY

In one general aspect, the present invention is directed to computer-implemented systems and methods for provisioning user entitlements and then persisting these user entitlements on a cloud network, such that the persisted user entitlements can be accessed and retrieved by applications hosted on the same cloud network or on a company's premises. In other aspects, the present invention is directed to computer implemented systems and methods of user entitlements persisted on a cloud network and mapped in real-time to third party applications, websites, and services (referred to herein collectively as "3rd/third party apps") connected to the cloud network. In several general aspects a server, such as a Run-Time Access Control Server (RTAC server), retrieves and resolves strict, complex user entitlements from a cloud database, where the results are then provided to a requesting cloud application or third party requester. These complex entitlements, could also, in some embodiments, be strict multi-dimensional entitlements.

In some aspects, what is disclosed are simple entitlements stored on a cloud database where the entitlements can be fetched, retrieved and/or resolved by a server which then relays the resolved entitlements to external third parties that are not on the cloud network but connected to it through a universal API that allows mapping of the entitlements to the third party external applications and services. This eliminates the need for direct integration between an enterprise network and third-party providers (such as Software as a Service (SaaS) providers). This eliminates risks of mismanagement of user entitlements by third party providers, reduces complexities of these attributes.

These and other benefits that can be realized through various embodiments of the present invention will be apparent from the description that follows.

BRIEF DESCRIPTION OF DRAWINGS

Various embodiments of the present invention are described herein by example in connection with the following figures.

DETAILED DESCRIPTION

Figure 1:
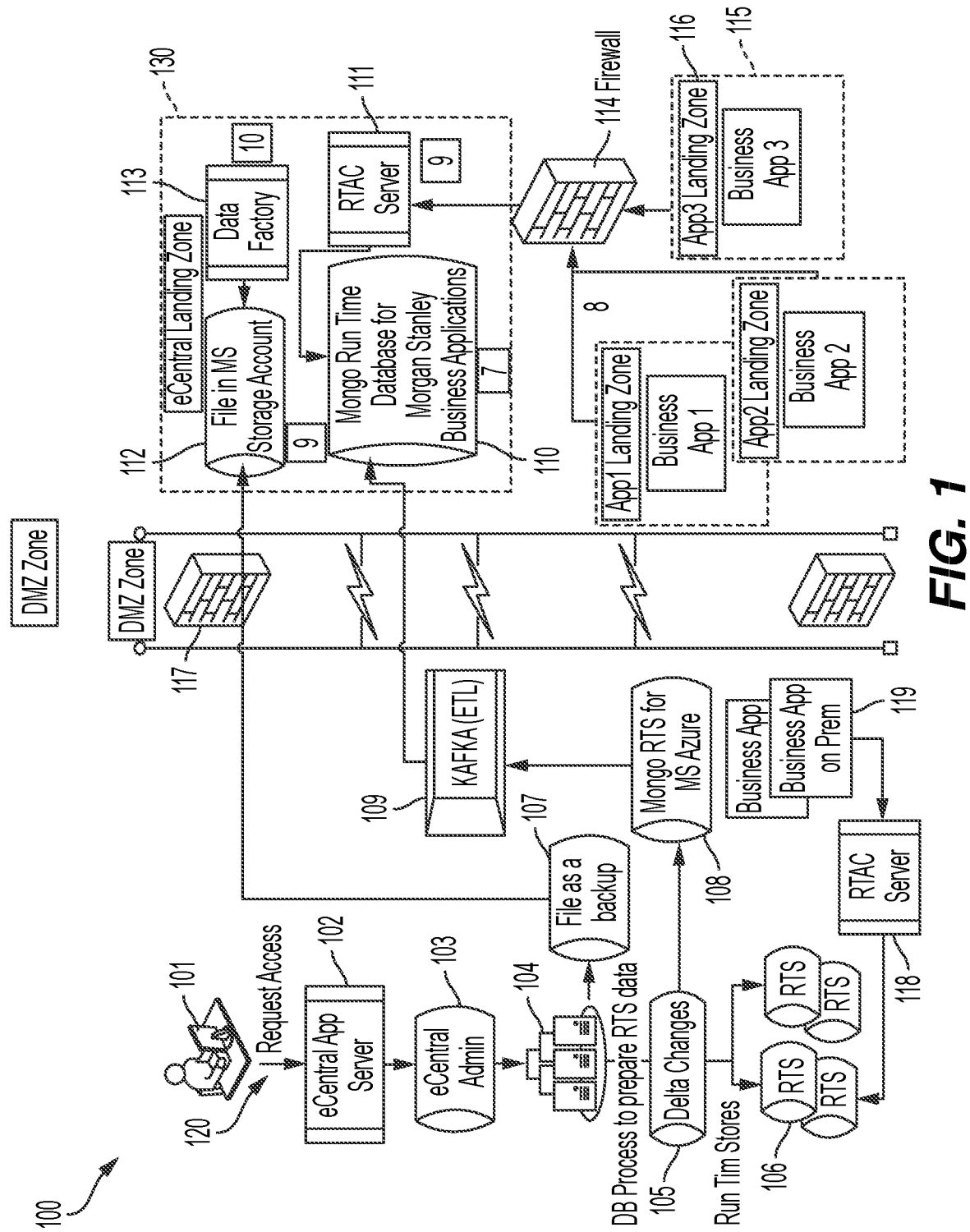
FIG. 1 illustrates in a diagrammatical format, one embodiment of an architecture of the systems and methods described herein of an enterprise network utilizing an advanced user entitlement management system integrating with third party applications through a cloud network, according to at least one aspect of the present disclosure.

A user entitlement, permission, or user entitlement profile (collectively referred to herein as "user entitlement") defines one or more permissions or access rights associated with a user, group, or entity in relation to at least one business or system function. A user entitlement can generally be defined (but without limitation) as some combination of access rights to a resource and accompanying actions to the relevant resource, and in some instances with additional coverage rules or restrictions that can be applied to these entitlements. A combination of a resource(s) and corresponding action(s) on that resource(s) can be classified or grouped together as an 'activity' that may in turn be grouped into broader entitlements or groupings, such as 'roles' or 'profiles' with other activities, resources, actions, and/or coverages.

A 'query' or 'request' for an entitlement, is when an application, either of the local business/enterprise or a third party application (that may be on an external network), attempts to ascertain whether the user, entity, or device has a permission to perform a certain business or system function represented by the queried resource, action, or activity, or in complex queries and activity (action on resource combination) with additional restrictions or rules.

A User entitlement management systems ("UEMS") is a software or platform that allows networks, systems organizations and/or enterprise networks (these all collectively referred to herein simply as "enterprise") of organizations to manage and control user access rights and permissions across systems and resources on the enterprise. UEMS is used to manage user access rights to resources, actions, and/or permitted activities on an enterprise. UEMS can include features such as user provisioning, Role-based access control (RBAC), access certification and auditing, access revocation, integration with identity and access management (IAM) solutions, and a user interface to allow entitlement creation and management.

However, UEMSs can face a number of technical and implementation problems. One problem is that these systems only allow provisioning and persisting of user entitlements on local networks, making it difficult and increasing latency for applications from the cloud, or third party applications on external networks to access, utilize, or rely on these locally provisioned and persisted/stored user entitlements. A cloud application or a third party application on an external network has to access the local network of the enterprise or at least a portion of the enterprise network to query a database storing user entitlements, which increases security risks in the network.

Additionally, the sheer number of these user entitlements and profiles that need to be created and stored in a database to cover as many situations as possible, makes managing and accessing these user entitlements difficult and resource intensive. Each created user entitlement defines a very specific situation or user/resource permission combination, which makes retrieving and fetching these entitlements slow, as each application that is making a query or request to determine user access rights or entitlements has to traverse iteratively/sequentially and process a large number of permutations and combinations of different entitlements (e.g., to the various available resources, the various action, activities, other attributes, or combinations thereof) to then retrieve an answer or outcome to its query/request for a user's access rights. For example a query may include a user role or title such as a 'secretary', a location, such as 'Canada office', a resource such as 'printer/photocopier', and an activity such as 'color printing'. The query would have to traverse and process through a large number of different combinations of stored user entitlements in a table and/or local enterprise database, the simple entitlements including the various available resources, the various actions, activities, other attributes, or combinations thereof such as a combination of a secretary and the Canada office, as well as combinations of a secretary and the printer, as well as combinations of the Canada office and the printer, and then the Canada office and color printing, etc., to determine which combinations are permitted and then combine/aggregate all the different stored entitlements to determine how the query is answered or whether to provide user permission to/based on the entitlement request or query.

In current technologies, user entitlements are generally simple. As discussed previously, these simple entitlements and rules do not lend themselves to complex scenarios. A simple entitlement is created under traditional user profiles or user groups and covers the relationship between a user and a single resource and/or action. The basic nature of simple entitlements necessitates an exponentially large number of individual simple entitlements to be provisioned and stored in a database to provide the various combinations of possible necessary to cover a wide range of possible scenarios/combinations of permissions/user/resources/activities that will define a user's rights in numerous scenarios. This makes it slow and resource intensive for an application, network, or server to determine the user's access rights in complicated scenarios with various possible combinations of resources, actions and attributes made up of combinations of basic, numerous stored simple entitlements. In traditional systems and methods therefore, resolving complex situations requires numerous separate simple entitlement building blocks to be identified, determined, selected and combined which leads to longer processing times and resource usage, for example to iterate through the numerous combinations, using up large amounts of computing resources to resolve a query or request for a user entitlement. Furthermore, users or entitlements on a third party application may not match with those designed in the local network requiring additional processing for mapping entitlements to those of the third party as. Fetching entitlements from a local networks can also cause lag or latency issues in addition to network access and security issues.

In various embodiments, the present invention introduces enterprise roles which can comprise combinations of simple and complex entitlements required to perform certain business or system function, for example Branch Manager or Unix Administrator. Simple entitlements can be described as a permission to an action and/or resource (in most cases simple entitlements are generally permissions to an action-resource combination) and can be assigned as such to an individual, group, or entity. A complex entitlement (also referred to herein as a "multi-dimensional" user entitlement) can be created out of one or more simple entitlements, (i.e., can be various action-resource combinations) and are also further limited by a dimensional coverage, which can define a broad restriction, such as a geographical area limiting where the permission/access rights apply. These Multi-dimensional user entitlements can be grouped together and in some instances with other simple entitlements into user profiles, roles, or user groupings ("collectively referred to herein as "enterprise roles") to define complex combinations of access rights. A business app or other part of a system can query a database storing these profiles, roles, or grouping of user access rights to determine whether a user has an entitlement, the multi-dimensional nature of these groups allow an application to query an entitlement, a profile, or role which can expand and provide a response (for example a binary response) based on the underlying entitlements making up the profile or group, resulting in reduced processing to determine an answer since a restrictive coverage applied would automatically be able to negate or eliminate all entitlements not falling within its scope. A response can be quickly transmitted that can in some aspects, be a binary response, as to whether the access rights to for an action/resource/user or specific scenario is permitted by the stored entitlements. This effectively allows a smaller number, yet more complex/multi-dimensional entitlements to be created and queried, to produce query responses more efficiently, especially for queries relating to complex combinations of access rights.

This disclosure presents solutions for standardized user entitlement management systems and processes that can be incorporated into an enterprise and are then mapped to various applications, whether these applications are hosted locally on premises, on the same cloud network, or externally as third party applications on third party networks. The systems and methods presented herein are capable of implementation in both a local and a cloud environment to reduce latency and security issues that could be created by allowing or requiring external applications access to local enterprise networks. The system can be based upon both simple and complex entitlements user right architectures/models to allow efficient implementation of complex entitlements into third party business or other applications/services.

FIG. 1 illustrates in a diagrammatical format, one embodiment of an architecture 100 of the autonomous systems and autonomous methods described herein of an enterprise utilizing a UEMS that provisions entitlements on a local network 120 and persists it on a cloud network 130, according to at least one aspect of the present disclosure. Architecture 100 can be used to create new entitlements through entitlement creation requests, and can be used to respond to entitlement queries from applications to resolve user access rights or entitlements. Architecture 100 can include one or more users 101 that submit, edit, or contribute to an entitlement creation request to create/provision a user entitlement, user role, or user profile for access rights to action(s) and/or resource(s) in an enterprise. The entitlement to be created can include simple or a complex entitlements or combinations thereof such as enterprise roles.

The user entitlement creation request is sent to, an eCentral transaction or application server or database 102 (referred to herein as "eCentral app server"). The eCentral app server 102 is responsible for access management functionality in architecture 100. The eCentral app server 102 handles incoming requests from business applications and responds with appropriate information it pulls from a central database or server, such as eCentral Admin server or Database 103 (referred to herein as "eCentral admin"). The eCentral admin 103 stores entitlement models, entitlement definitions, classifications of entitlements as business/app entitlements or system entitlements, and approval models associated with or attached to stored entitlement models. This database is not used by applications or the system for run-time validation of entitlement queries.

Business applications use an RTAC (Run-Time Access Control) database(s) 106, which contains flattened data optimized for speeder retrieval for such queries. An entitlement query is a query regarding access rights of a used that queries the RTS data store(s) such as the RTAC database(s) 106 with a predefined query from a connected business application, or from within the enterprise itself to determine whether a user has one or more access rights to an action, resource, or other attributes, or combinations thereof. The user entitlement query can include such queries as, for example, "add user Adam to trade stocks on trading application x". An entitlement query can be query for one or more simple or complex/multi-dimensional entitlements, or combinations thereof.

The eCentral app server 102 executes an approval model, associated to the entitlement creation request, which it retrieves from the eCentral admin 103. An approval model defines the approval workflow, and can be associated to one or more entitlement models with both the approval and entitlement models stored in the E-Central administrator 103. Approval models define how entitlement creation requests are handled, e.g., the series of required approvals, number/type/identity of approvers needed at each step or at user interface notifications/actions/steps.

In one example, when a user submits the entitlement creation request, the eCentral app server 102 receives the request and routes it via an approval flow user interface (UI), that can in some embodiments, be executed according to the approval model. This automated autonomous process can include sending an email to the requestor user acknowledging the request and to approver users notifying them about pending approval requests in addition to requesting input from other users such as enterprise administrators.

The eCentral application server 102 can also periodically optimize 104 (for example once every 10 min) the user entitlements for storage in RTAC database(s) 106 as run time store (RTS) data. Optimizations can comprise flattening entitlements from 'higher'/more complex Roles/Access Profile levels to the 'lower'/simpler 'Actions' and/or 'Resources' and coverages/restrictions levels when applicable (where Roles/Access Profiles encompass and comprise access rights to 'Actions' and/or 'Resources', and/or coverages/restrictions, or combinations thereof). As one non-limiting example, the three entitlements 'Submit Trade', 'View Trade', and 'Cancel Trade' can be combined into a new entitlement at the 'role' level, i.e., an 'Equity Trader role' and the role is then limited by a restriction/coverage to only two stocks, for example, AAPL and NVDA stocks, then an entitlement to the equity trader role will have access rights to the action/resource or simple entitlements making up the role with the restrictions/coverages to only trade AAPL and NVDA applied.

The profiles and/or the entitlements can be stored in the eCentral Admin Database 103 or as RTAC database(s) 106 as a user profile in two data tables joined together, for example tables for trading AAPL and NVDA to reduce resource use and response time to a calling application. Therefore, in order to improve response times, the stored data in the tables can also can be expanded to reveal more granular entitlements within the table, for example for the Action/Resource levels.

For example, in a storage database such as an RTAC database(s) 106 containing run time store (RTS) data, 6 data rows from the two tables are concatenated and are expandable when a call from an application is made, to reveal: 'User—entitled to Submit Trade for AAPL' 'User—entitled to View Trade for AAPL'. 'User—entitled to Cancel Trade for AAPL'. 'User—entitled to Submit Trade for NVDA'. 'User—entitled to View Trade for NVDA'. 'User—entitled to Cancel Trade for NVDA'. The optimization therefore includes storing the data in such a way to be easily expandable upon receipt of an entitlement query. In one embodiment, before newly optimized data is loaded into RTAC database(s) 106 (RTS—run time store), the data is stored in the form of files as the back-ups. In case the data needs to be recovered quickly, the back-up files are loaded to RTAC database(s) 106 for run-time validation and responding to queries even though Admin DB is not working, this ensures continuity and resiliency of business applications that need to query RTS data using RTAC APIs on RTAC database(s) 106.

The e-Central app server 102 then processes the entitlement creation request based on stored approval templates and stores the created entitlement or enterprise role as run time store (RTS) data 104 stored in RTAC database(s) 106. This data can be stored or filed as a local backup 107 on the local network 120 after being approved by the required approvers. Hence, local business applications 119, for example those running on the enterprise or its hardware might retrieve all entitlements data from the RTS data stored in RTAC database(s) 106. Changes, or updates to existing entitlements or new user entitlements 105 can be stored on RTAC database(s) 106 and pushed onto a local database such as an RTS store 108 (for example Mongo). Data is pushed from the RTS store 108 via an ETL (Extract, Transform, Load) tool or distributed event store and stream-processing platform 109 such as Kafka or HVR (database-to-database) into a cloud RTS storage 110 (for example Mongo RTS). The local backup 107 can be sent to a cloud platform management storage account 112, which can act as a cloud backup for cloud-based databases/storage systems on the cloud network 130. The cloud network 130 is connected to local network 120, in some embodiments via a distributed event store and stream-processing platform 109 such as Kafka or an ETL tool such as Kafka ETL or HVR. In several embodiments, demilitarized zone 117 or other physical or logical subnetwork or security perimeter with features known in the art such as firewall(s) and other security components is placed between the local network 120 and the cloud network 130.

Data may be transferred to a cloud database, such as cloud Mongo DB 110 using the distributed event store and stream-processing platform 109, for example Kafka and/or a tool such as Kafka ETL. This cloud database 110 is accessible by a server or service 111, such as a Run-Time Access Control server 111 (referred to herein as "RTAC Server"). The RTAC server 111 resolves requests for entitlements and permissions from cloud applications 115 and other requestors based on the saved user entitlements in the cloud database 110. The applications 115 and the RTAC server 111 can in several embodiments be separated by a firewall 114 or other security perimeter or solution. A local version RTAC server 118 exists on the local network of the enterprise, i.e., on premises to resolve queries from system-based business application 119.

In many aspects, each application can have a dedicated landing zone 116 in the cloud network 130. In several other aspects, a data factory 113, can be a cloud-based ETL and data integration service that allows the creation of data-driven workflows for orchestrating data movement and transforming data. Which similarly to the eCentral app server 102 can be used as an entitlement creation or editing component and/or be used as a back-up solution for loading data into the cloud network 130.

Architecture 100 allows the provisioning of user entitlements in the local network 120 which are then pushed into the cloud network 130 where it is persisted in the cloud database 110 on the cloud network 130. Having user entitlements persisted in cloud network 130 makes it much faster for applications 116 to query user entitlements in the cloud database 110 on the cloud. Reducing latency and length of time required for communication. Requesting entitlements from a local network would require access to at least a portion of the local network which allows some access past the demilitarized zone or perimeter 117. Containing access to the cloud database thus not only reduces latency but also reduces potential security risks of allowing applications access to a local network.

Figure 2:
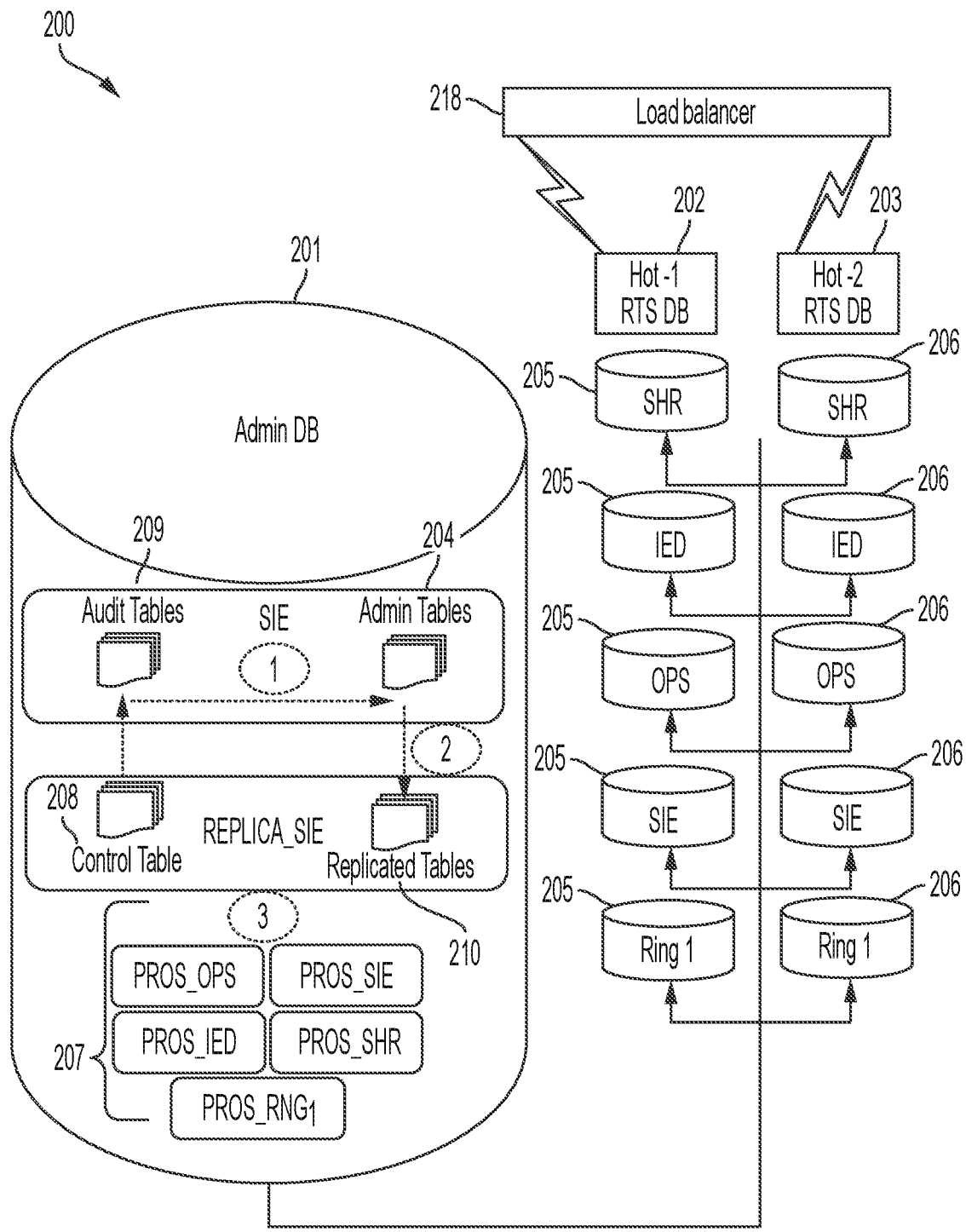
FIG. 2 illustrates one embodiment of an architecture of a database system for storing and managing multi-dimensional user entitlements in real-time, according to at least one aspect of the present invention.

FIG. 2 illustrates one embodiment of an architecture of a database system for storing and managing multi-dimensional user entitlements in real-time, according to at least one aspect of the present invention. With reference now primarily to FIG. 2 alongside FIG. 1, in several embodiments, the structure of a database system 200 includes admin database 201 (which corresponds to eCentral admin 103, FIG. 1), at least part of which is replicated to an RTS data store 110 on the cloud network 130, FIG. 1, for persisting on the cloud, for example, RTS data store 110 can be partially dedicated to an admin database 201 and also can comprise/utilize the structure of RTS databases such as HOT1 RTS database 202 and HOT2 RTS database 203 that respond to real-time queries. RTAC database(s) 106, FIG. 1 can also comprise/utilize the structure of RTS databases such as HOT1 RTS database 202 and HOT2 RTS database 203. Admin database 201 stores the user entitlements provisioned on the local network and pushed onto the cloud network 130, FIG. 1 and corresponds to what is stored by eCentral admin 103, FIG. 1. The Admin database 201 may contain various tables 204 to ensure the integrity and structure of the stored user entitlements, including a control table, audit tables, admin tables, and replicated tables. Admin tables 204, FIG. 2 are core tables that contain entitlements models, approval workflows, fulfillment models, history of user requests, and the like. They are also used in eCentral admin database 103, FIG. 1. Audit tables 209 keep the history of any change in at least one table of the various tables being used. Replicated tables 210, FIG. 2 refer to schema used for storing data from Admin tables 204, FIG. 2 to reduce load pressure from Admin tables 204, FIG. 2 while processing data. Replicated Tables 210, FIG. 2 are source for data optimization processes controlled by the Control Table 210, FIG. 2. Then data are stored in processing tables 207, FIG. 2 before they are loaded to RTS databases such as HOT1 RTS database 202, FIG. 2 and HOT2 RTS database 203, FIG. 2.

The user entitlements stored in admin tables 204, FIG. 2 can be organized into groupings 207 corresponding to created user profiles or groups of the user entitlements. These user groups are then replicated, copied or transferred onto multiple databases such as real time statistics databases ("RTS databases"). In one embodiment there are two RTS databases or RTS database clusters, a hot-1 RTS database cluster 202 ("cluster 202") and a hot-2 RTS DB cluster 203 ("cluster 203") made up of a number of smaller databases, 205 and 206, respectively, which may be replicas of each other, the replicas created to avoid a single point of failure, and allow responses to multiple queries/a larger number of queries at one time, where individual smaller databases 205 as part of cluster 202 and individual smaller databases 206 as part of cluster 203. The admin database 201 primarily functions to store the plurality of multi-dimensional user entitlements. While clusters 202 and 203 are active databases that respond to queries from servers, such as an RTAC server 111, FIG. 1, and update their data based on what is in the primary database 201.

In several embodiments, when an RTAC server 111, FIG. 1 queries the database/active directory 110, FIG. 1, it queries and receives a response from the clusters 202, 203 which are designed to be active/active (or hot/hot) database clusters 202, 203. Having duplicate databases increases and prioritizes stability and ensures quick responses if one cluster 202, 203 is at full load. In several aspects, there is a load balancer 218 ahead of these database clusters 202, 203 to determine which cluster the queries should be directed to, the determination being based on the current and/or estimated future load of each cluster 202, 203. Furthermore, if there are technical issues, and one cluster 202, 203 fails, there is no wait time since the other available live cluster 202, 203 would take its place. Duplication of RTS databases eliminates the problem of a single point of failure.

In many embodiments, a specific mechanism is implemented to push out user entitlements and updates to user entitlements from the core admin DB 201 into the clusters 202, 203, where the mechanism updates one schema of one of the clusters 202, 203 according to the structure of the new or updated user entitlements in core admin database 201, while disconnecting the cluster 202, 203 that is being updated from queries and from responding to queries, until the update is complete, and then the same process is repeated with the other cluster 202, 203 yet to be updated, allowing the updated cluster 202, 203 to be the sole cluster that receives and responds to queries as the cluster 202, 203 currently being updated is disabled form receiving and responding to queries while being updated.

Figure 3:
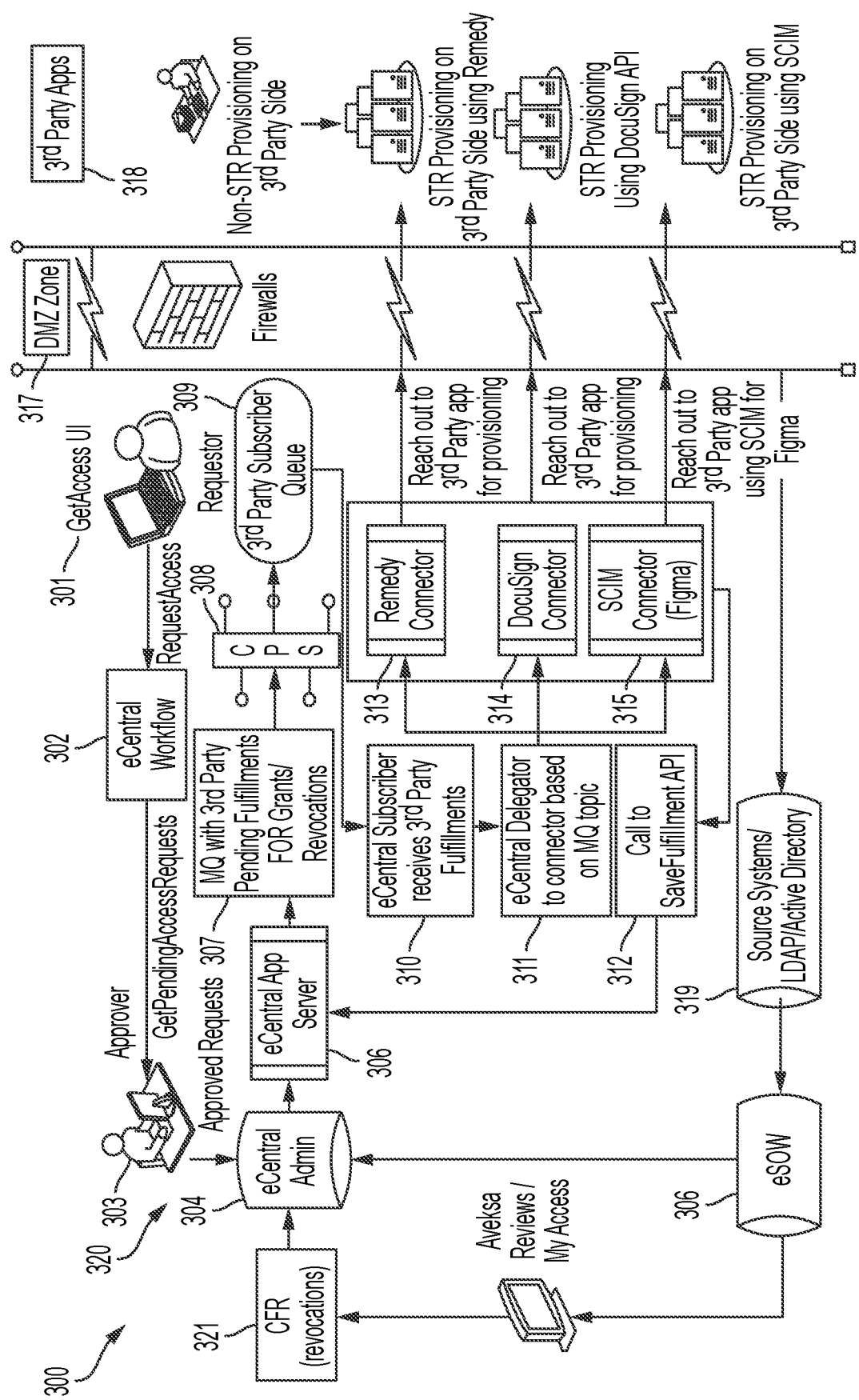
FIG. 3 illustrates one embodiment of a user entitlement management system of an enterprise network connected to third party applications and services that are on external networks, via traditional means, where there are no system-to-system integration nor cloud integration with the third party applications and services

FIG. 3 illustrates one embodiment of a traditional user entitlement management system in a local enterprise network connected to third party applications and services that are on external networks, where there is neither system-to-system integration nor cloud integration with the third party system. In various aspects, the UEMS 300 provisions at least one of simple user entitlements or complex user entitlements and connects and maps these user entitlements to third party external applications, websites, services, or servers via various components, and processes through manual provisioning, where these entitlements are enforced by the third party.

In one embodiment, a requestor or User interface 301 for creating new entitlements sends a request to an eCentral transaction server 302 which is then transmitted to an approver or administrator 303 to manually review and approve. Once approved, the request is sent to an electronic central administrative server or database 304, where it can then be transmitted to a data warehouse such as a Entitlements State of the World ("eSOW") 306, is a data warehouse, which collects data from all platforms including numerous source systems 319 that originate entitlements (including external third parties) and sends this data to downstream systems and components such as eCentral admin 304. eSOW 306 reconciles entitlements data collected from outside internal and external platforms and reconciles it with data in eCentral admin 304, which may receive data. The eCentral admin 304. then sends the created entitlement(s) to an electronic eCentral app server 306 that interacts with various components of system 300, including responding to requests from third party MQ or middleware products 307 ("middleware 307") that may include IBM MQ for publish and subscribe messaging and queues.

Integration with third parties, for example with business applications such as FIGMA or Docusign can be undertaken in these type of systems without direct/or straight-through integration, for example, by using API interface integration that would allow manual entitlement creation provisioning and management to comply with the requirements of the third party applications with one or more custom-made API connectors 313-315 that interface with the third party business apps 318. A third party request fulfilment API 312 can connect to the one or more API connectors 313-315 to receive entitlement fulfilment requests, which may for example comprise requests to create certain user entitlements that match those on the third party apps 318, or for a specific user permission or entitlement query. The UEMS 300 can then receive third party app fulfilment requests by the eCentral app server 306 through a call 312 to the relevant API connectors 313-315.

The eCentral app server 306 can pull data, for example of newly created entitlements, or entitlement models, entitlement definitions, or current user entitlements, or other information sought by the relevant third party 318, from eCentral admin 304 and send this response to the third party fulfilment request via the middleware 307 to a cyberphysical system 308 ("CPS") that can be used to integrate the on-premises computing components with third party subscriber queues 309 which order, manage the request, queries and messages from the third party apps 318, then delivers the response to a centralized subscriber service 310, that pushes the response to an eCentral delegator 311 that determines with API connector 313-315/3rd party app 318 that the response relates to and should be pushed to. Revocations of entitlements 321 can also be determined/requested from third party apps or other data sources/customer reviews, and can be undertaken by a CFR system which pushes revocations into eCentral admin 304 to revoke one or more stored entitlements.

Figure 4:
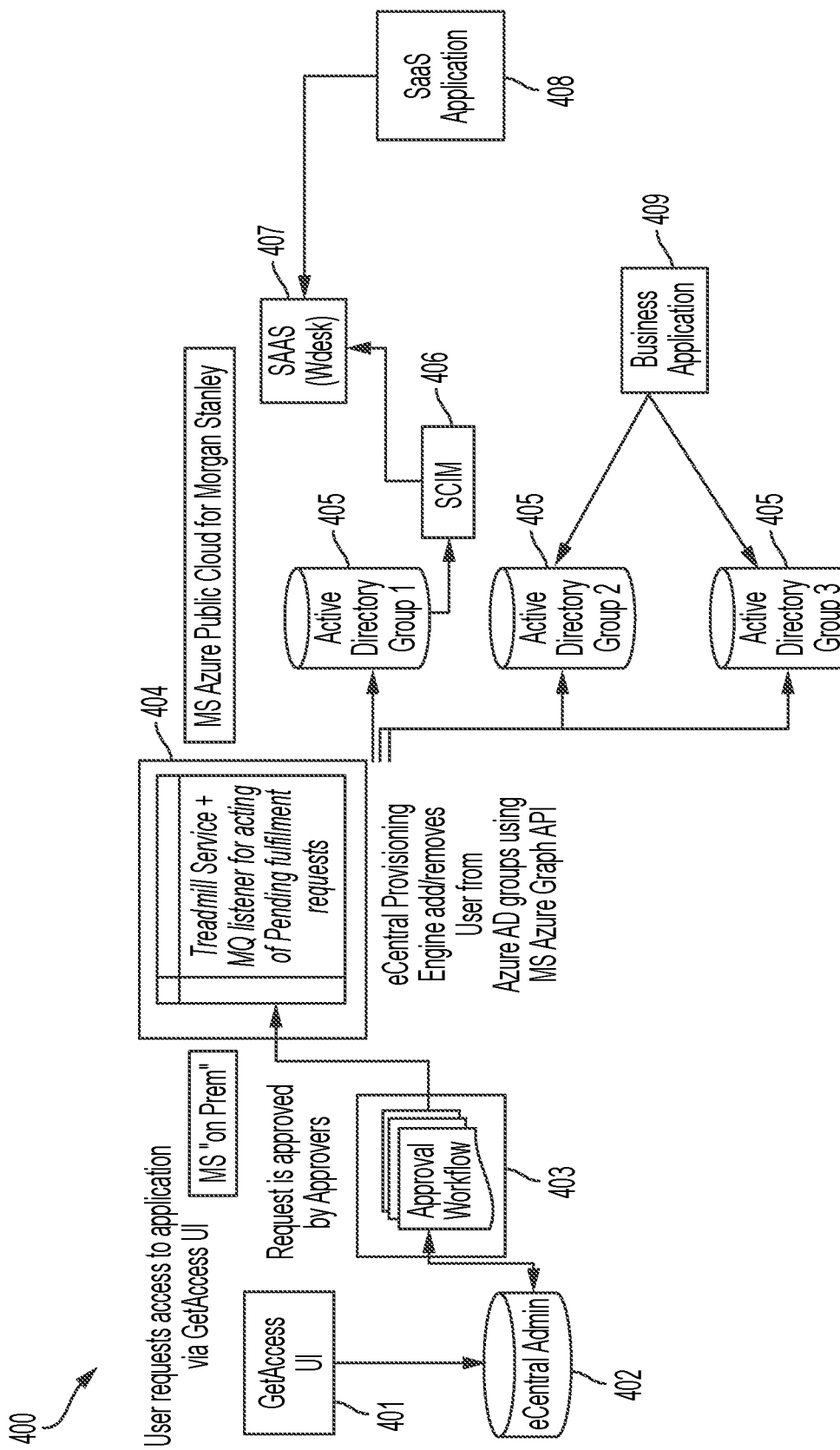
FIG. 4 presents one embodiment of an architecture of a user entitlement management system connected directly to a third party application or service via a cloud network or cloud management platform, according to at least one aspect of the present disclosure.

FIG. 4 presents one embodiment of an architecture of a user entitlement management system in a cloud enterprise network connected directly (straight-through connection) to a third party application or service through a cloud management platform or cloud computing service, according to at least one aspect of the present disclosure. In various embodiments, a requestor or user interface 401 provisions or requests creation or generation of a user entitlement which is sent to an eCentral admin 402, wherein the user entitlement would have to go through an approval workflow 403, which can include automated and manual approval processes as already discussed herein. Upon approval, an eCentral provisioning engine 404 comprising a treadmill service and an MQ (subscription messaging platform listener) adds, updates, or removes user entitlements from active directory group(s) 405 of a cloud management platform, for example Azure MS, which can be accessed directly by business applications 409 that are on the same cloud network (as discussed in regards to FIG. 1).

However in order to translate, map and connect the user entitlements in active directories 405 to third party apps such as SaaS, an API interface 406 (for example a System cross domain identity management 'SCIM') compatible with the cloud management platform can be used to connect and map the user entitlements saved on the active directories on the cloud network to third party apps managed on the same cloud computing service/cloud management platform. SCIM is a form of system-to-system communication between networks, systems and/or enterprises. The API interface 406 can include or be a feature in the cloud management platform, e.g., MS Azure, that manages the cloud network (e.g., cloud network 130, FIG. 1) which allows or facilitates a batch process to read data from at least one cloud management platform Directory group (e.g., from one or more of active directory group(s) 405) and calls SaaS API(s) that are associated with SaaS Application(s) 408. The API interface 406 in several embodiments is written according to SCIM standards. If one enterprise uses SCIM and another (for example Saas Application(s) 408) utilizes the SCIM standard, all that is needed to create user entitlements or run entitlement queries is the URL of the API to be called to carry out the various possible functions, which include and are not limited to: adding/removing user(s) from SaaS Authorization store 407, adding a user to an entitlement (such as a role or profile), checking the status of a user or user entitlements, or run a report, etc. SaaS Authorization store 407 can exist in a cloud management platform, e.g., MS Azure, or in other platforms or networks allowing third party apps such as SaaS application 408 to retrieve, query or have user entitlements applied onto it by the enterprise via one or more connected APIs 406 via the SaaS authorization store 407 that acts as an interface for active directory group(s) 405 and SaaS application(s) 408, and/or with an RTAC server, such as RTAC server 111, FIG. 1 to resolve their queries/requests and provide an answer, result or outcome. In this embodiment, since entitlements are added to an active directory group 405 of a computing service/cloud management platform compatible with the SaaS applications 408, there is no need to connect to these third parties using custom-made third party APIs, or managing/maintaining these third party APIs. In this embodiment, SaaS Applications 408 can retrieve/fetch or be provided information from active directory groups 405 where entitlements, roles, or profiles are stored, where the active directory group 405 is connected to a SCIM 406 that connects to a third party SaaS provider and SaaS application 408.

Figure 5:
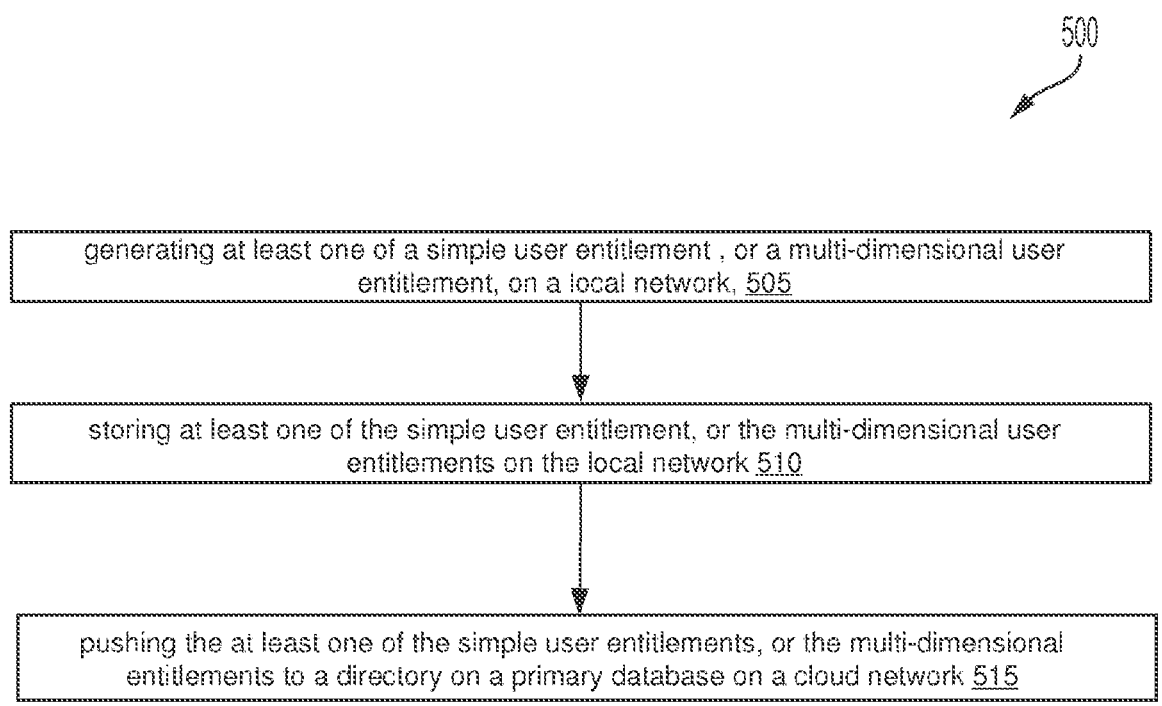
FIG. 5 presents one embodiment of a method for provisioning and persisting a user entitlement management system on a cloud network, according to at least one aspect of the present disclosure.

Referring now primarily to FIG. 5, in conjunction with FIG. 1. FIG. 5 presents one embodiment of a method 500 for provisioning user entitlements on UEMS on a local network, such as local enterprise network 120, FIG. 1, and persisting them on a cloud network, according to at least one aspect of the present disclosure. In one aspect of method 500, at least one user entitlement that can be a simple or a complex user entitlement is generated 505 on a local network, for example on a computing devices, servers or databases of an enterprise or other local network. The generated simple or multi-dimensional/complex user entitlements are then stored 510 on the local network, for example on a storage device or database, for example eCentral admin 103, FIG. 1.

Continuing to refer to FIG. 5, in conjunction with FIG. 1 and FIG. 4, the method 500 continues with the generated entitlement(s) are hen pushed 515 to a directory or directory group on a database on a cloud network, e.g., the cloud network 130, FIG. 1. In some embodiments of the method 500, can be managed by a cloud management platforms such as Microsoft Azure™. In several embodiments, the cloud network also includes an RTAC server, e.g., RTAC server 111, FIG. 1, that receives queries from applications on the cloud network, e.g., applications 115, FIG. 1, or third party applications, e.g., SaaS applications 408, FIG. 4 connected to the cloud network via a SCIM, e.g., SCIM 406, FIG. 4, or managed by the same cloud management platform.

The RTAC server resolves entitlement queries received from the applications by querying the cloud database where the created user entitlements are pushed 515 to, stored, and persisted. The RTAC server then provides the querying application(s) the outcome or result it retrieved by querying the database. The resolving by the RTAC server of an entitlement query can comprise applying coverages to eliminate any stored entitlement that is not included or covered by the coverages. The RTAC server then expands tables containing the remaining entitlements, revealing those with the requisite attributes, actions and resources, based on which the RTAC server determines an outcome to the under query.

Figure 6:
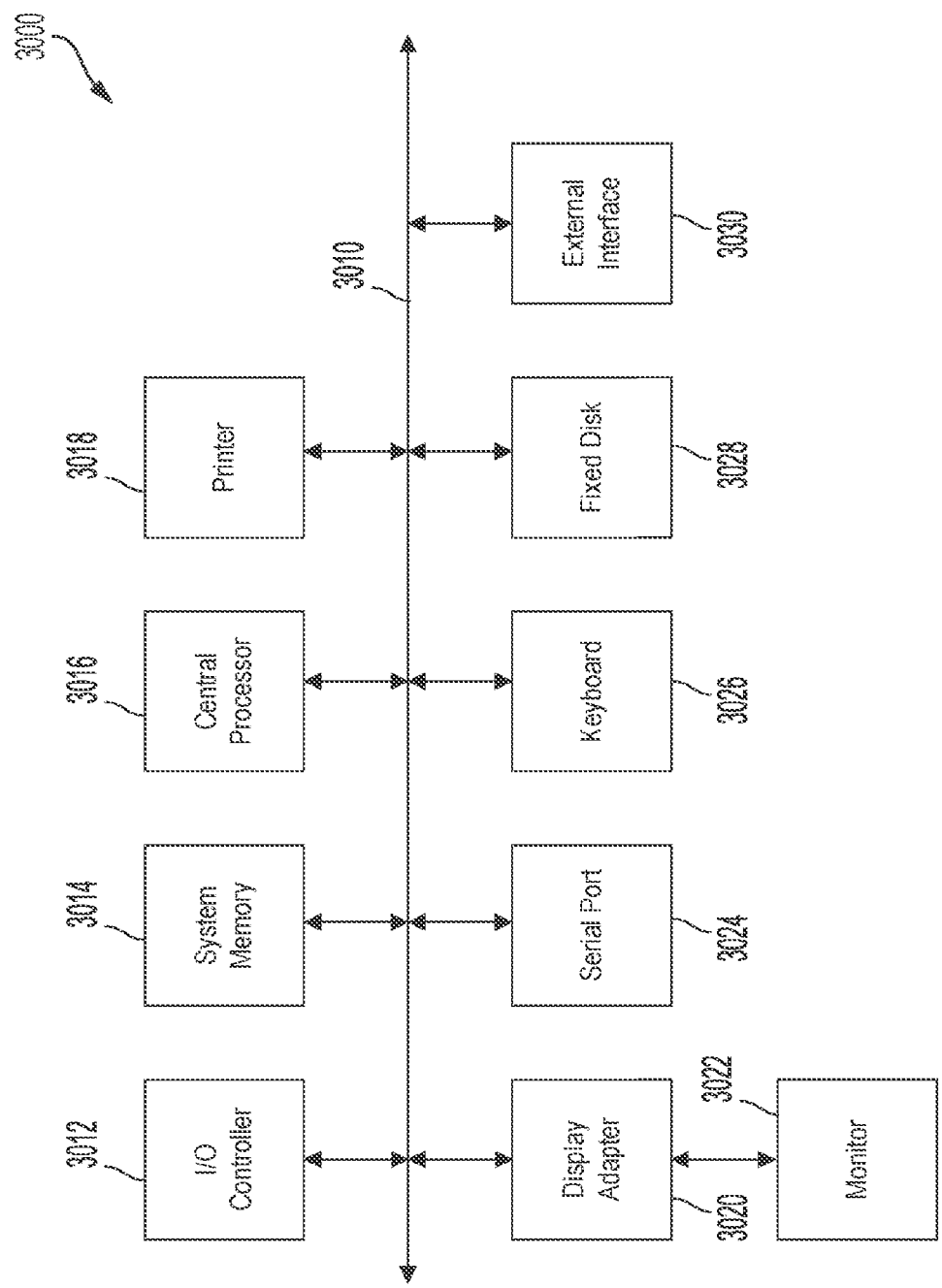
FIG. 6 presents a block diagram of a computer apparatus, according to at least aspect of the present disclosure.

FIG. 6 is a block diagram of a computer apparatus 3000 with data processing subsystems or components, according to at least one aspect of the present disclosure. The subsystems shown in FIG. 6 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

Figure 7:
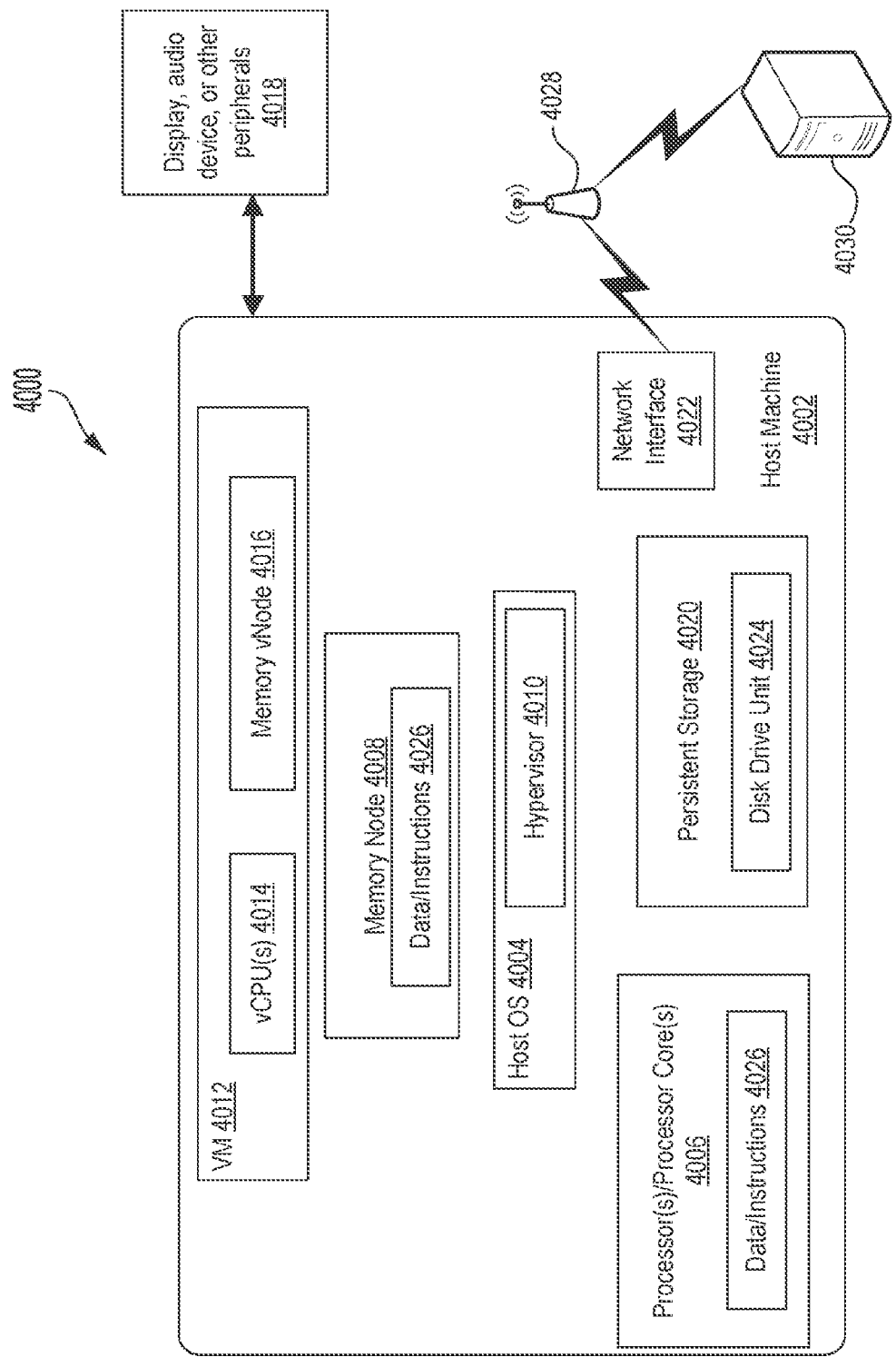
FIG. 7 is a diagrammatic representation of an example system that includes a host machine within which a set of instructions to perform any one or more of the methodologies discussed herein may be executed, according to at least aspect of the present disclosure.

FIG. 7 is a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 3002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other, or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 4030 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the method according to various aspects of the present disclosure are provided below in the following numbered clauses. An aspect of the method may include any one or more than one, and any combination of, the numbered clauses described below.

Clause 1. A streamlined user entitlement creation, revocation and implementation system, the system comprising a local network that comprises connected computer devices and a central database, such that the local network is configured to: generate a plurality of multi-dimensional user entitlements, on the local network, wherein each multi-dimensional user entitlement of the plurality of multi-dimensional user entitlements is capable of being defined by dimensional coverages; store the plurality of multi-dimensional user entitlements in a central admin database on the local network; and push the plurality of multi-dimensional user entitlements to a cloud network coupled to the local network; the cloud network comprising: a cloud network database to receive the plurality of multi-dimensional user entitlements; at least one enterprise application; and an RTAC server, coupled to the cloud network database, and the at least one enterprise application, the RTAC server configured to: receive an entitlement query from a requestor application, the requestor application comprising at least one of: the at least one enterprise application, or a third party application connected to the cloud network; based on the entitlement query, query the cloud network database; and resolve, based on the query, an entitlement outcome from the plurality of multi-dimensional user entitlements, wherein the entitlement outcome defines an access right that comprises at least one of: an action, a resource, the dimensional coverages, or combinations thereof, wherein the entitlement outcome comprises a response to the entitlement query enforceable by the requesting application.

Clause 2. The system of Clause 1, wherein cloud network database is configured to: receive a request from the RTAC server based on the entitlement query; and provide the plurality of multi-dimensional user entitlements to the RTAC server.

Clause 3. The system of any of Clauses 1-2 wherein, the resolving by the RTAC server comprises the RTAC server to: fetch the plurality of multi-dimensional user entitlements from the cloud network database; expand the plurality of multi-dimensional user entitlements to determine dimensional coverages applicable to each multi-dimensional user entitlement of the plurality of multi-dimensional user entitlements; apply the dimensional coverages based on the entitlement query to eliminate irrelevant multi-dimensional user entitlements from the plurality of multi-dimensional user entitlements; and aggregate remaining user entitlements in the plurality of multi-dimensional user entitlements to determine the entitlement outcome to the entitlement query.

Clause 4. The system of any of Clauses 1-3 wherein the entitlement outcome is at least one of a binary response, a response detailing permitted entitlement options that the requestor application can implement, or data to facilitate the requestor application to make a determination for an outcome to the entitlement query.

Clause 5. The system of any of Clauses 1-4 wherein the RTAC server is further configured to send the entitlement outcome to the requestor application.

Clause 6. The system of any of Clauses 1-5, wherein the cloud network database is configured to receive the plurality of multi-dimensional user entitlements from the local network; and store the plurality of multi-dimensional user entitlements.

Clause 7. The system of any of Clauses 1-6 wherein the cloud network is managed by a cloud management platform, the at least one enterprise application corresponds to a landing zone on the cloud network, based on the cloud management platform, wherein the at least one enterprise application is configured to send a request to the RTAC server to determine a user entitlement for the at least one enterprise application; and receive a response from the RTAC server comprising the entitlement outcome.

Clause 8. The system of any of Clauses 1-7 further comprising an API coupled to at least one external third party website, web address, or application not hosted on the cloud network, wherein the API is configured to map the multi-dimensional user entitlements stored in the central database to user profiles, permissions, or entitlements in the at least one of a third party website, web address, or application.

Clause 9. The system of any of Clauses 1-8 wherein the cloud network is managed by a cloud management platform.

Clause 10. The system of any of Clauses 1-9 wherein the third party application connected to the cloud network and the cloud management platform via a cloud management provider platform compatible API.

Clause 11. The system of any of Clauses 1-10, wherein a cloud management platform compatible API is a System for Cross-domain Identity Management (SCIM).

Clause 12. The system of any of Clauses 1-11 wherein the cloud network database is comprised of: an admin database to store the plurality of multi-dimensional user entitlements; a first plurality of RTS databases coupled to the admin database, wherein each RTS database of the first plurality of RTS databases stores a group user entitlements of the plurality of multi-dimensional user entitlements; and a second plurality of RTS databases coupled to the admin database, wherein the second plurality of RTS databases duplicates the first plurality of RTS databases.

Clause 13. The system of any of Clauses 1-12 wherein at least one of the first plurality of RTS databases or the second plurality of RTS databases is configured to receive the entitlement query from the RTAC server, wherein the first plurality of RTS databases and the second plurality of RTS databases are backups for each other.

Clause 14. A method for improved database user entitlement provisioning and management comprising: generating at least one of a simple user entitlement, a multi-dimensional user entitlement, or a combination thereof, on a local network, wherein the multi-dimensional user entitlement comprises user entitlements capable of being defined by dimensional coverages; storing at least one of the simple user entitlement, the multi-dimensional user entitlement, or combinations thereof in the local network; and pushing at least one of the simple user entitlement, the multi-dimensional user entitlement, or combinations thereof to a directory on a database on a cloud network, to persist on the database and be accessible to a querying application, the querying application can comprise at least one of cloud applications hosted on the cloud network, or third party applications connected to the cloud network.

Clause 15. The method of Clause 14, further comprising: receiving, by at least one component of the cloud network, an entitlement query from the querying application; and based on the entitlement query, fetch a multi-dimensional user entitlement of a plurality of multi-dimensional user entitlements from directory run-time database on the cloud network.

Clause 16. The method of Clauses 14-15, further comprising resolving the multi-dimensional user entitlement defined by the dimensional coverages to determine an entitlement outcome based on the entitlement query.

Clause 17. The method of Clauses 14-16 wherein the multi-dimensional user entitlement comprises at least one of defined access rights to resources, actions, restrictive coverages, or combinations thereof.

Clause 18. The method of Clauses 14-17, further comprising: updating at least one of the simple user entitlement, or the multi-dimensional user entitlement, or combinations thereof, to generate at least one updated user entitlement on the local network; and pushing the at least one updated user entitlement to the directory on the database on the cloud network.

Clause 19. A method for improved database user entitlement, provisioning, and management comprising: generating multi-dimensional user entitlements on a local network, wherein the multi-dimensional user entitlements comprise user entitlements capable of being restricted by dimensional coverages; storing the multi-dimensional user entitlements in a database on the local network; and pushing the multi-dimensional user entitlements to a directory on a admin database on a cloud network, to persist on the admin database and be accessible to at least one of cloud applications hosted on the cloud network, or third party applications connected to the cloud network via a cloud network management platform; receiving, by at least on component of the cloud network, an entitlement query from a querying application, the querying application comprises at least one of, an application hosted on the cloud network, a third party website, web service, or a third party app hosted on external networks; fetching the multi-dimensional user entitlements; and determining an entitlement outcome, based on the entitlement query, wherein the entitlement outcome determines applicable user entitlements form the multi-dimensional user entitlements of a plurality of multi-dimensional user entitlements stored in the admin database.

Clause 20. The method of Clause 19, wherein the method further comprises: resolving the user entitlements defined by the dimensional coverages to determine a multi-dimensional user entitlement based on the entitlement query.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP).

The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A streamlined user entitlement creation, revocation and implementation system, the system comprising:
   a local network comprising:
      an entitlement creation application server for creating user entitlements for users in an enterprise based on user entitlement creation requests received by the entitlement creation application server, wherein the user entitlements comprise a plurality of multi-dimensional user entitlements, wherein each multi-dimensional user entitlement comprises, for a user, a resource interaction permission control based on at least both an enterprise role for the user in the enterprise and a dimensional coverage for the user;
      a local network entitlement database system for storing the user entitlements created by the entitlement creation application server;
      a local network Run-Time Access Control (RTAC) server for resolving local network entitlement queries from local network applications on the local network, wherein the local network RTAC server is for resolving the local network entitlement queries based on the user entitlements stored in the local network entitlement database system; and
      a local network run time store (RTS) data store for storing user entitlement updates, wherein the user entitlement updates comprise updates to existing user entitlements and new user entitlements;
   a cloud network in data communication with the local network, the cloud network comprising:
   a cloud network database for storing the user entitlements based on the user entitlement updates received from the local network RTS data store; and
   a cloud network RTAC server, coupled to the cloud network database, the cloud network RTAC server configured to:
      receive a cloud network entitlement query from a cloud application in data communication with the cloud network, wherein the cloud network entitlement query comprises a query from the cloud application as to whether a user has permission to perform a function with respect to the cloud application;
      based on the cloud network entitlement query, query the cloud network database for user entitlement for the user; and
      resolve, based on the query to the cloud network database, an entitlement outcome for the user for the cloud application, wherein the entitlement outcome comprises a response to the cloud network entitlement query enforceable by the cloud application.

2. The system of claim 1, wherein the cloud network database is configured to:
   provide a multi-dimensional user entitlement for a user to the cloud network RTAC server in response to the query about the user from the cloud network RTAC server to the cloud network database; and
   the cloud network RTAC server is for resolving the entitlement outcome based on the multi-dimensional user entitlement for the user.

3. The system of claim 1 wherein the entitlement outcome is at least one of a binary response, a response detailing permitted entitlement options that the cloud application can implement, or data to facilitate the cloud application to make a determination for an outcome to the cloud network entitlement query.

4. The system of claim 1 wherein the cloud network RTAC server is further configured to send the entitlement outcome to the cloud application.

5. The system of claim 1, wherein the cloud network database is configured to:
   receive the user entitlement updates from the local network RTS data store.

6. The system of claim 1 wherein the cloud network is managed by a cloud management platform, the cloud application corresponds to a landing zone on the cloud network, based on the cloud management platform, wherein the cloud application is configured to:
   send a request to the cloud network RTAC server to determine a user entitlement for the cloud application; and
   receive a response from the cloud network RTAC server comprising the entitlement outcome.

7. The system of claim 1 wherein the cloud network is managed by a cloud management platform.

8. The system of claim 7, wherein the cloud application and the cloud management platform communicate via a cloud management platform compatible API.

9. The system of claim 8, wherein the cloud management platform compatible API comprises a System for Cross-domain Identity Management (SCIM).

10. The system of claim 1, wherein the dimensional coverage comprises a geographic area where access rights apply.

11. The system of claim 1, wherein the dimensional coverages comprise particular financial securities that users are permitted to trade.

12. The system of claim 1, wherein:
   a first user in the enterprise is permitted to trade only N financial securities, where N is greater than or equal to two; and
   the local network entitlement database system stores a multi-dimensional user entitlement for the first user in N tables joined together, wherein each of the N tables comprises a user entitlement for one of the N financial securities.

13. A method for improved database user entitlement provisioning and management comprising:
   generating, by an entitlement application server on a local network, user entitlements for users in an enterprise based on user entitlement creation requests received by the entitlement application server, wherein the user entitlements comprise a plurality of multi-dimensional user entitlements, wherein each multi-dimensional user entitlement for a user comprises a resource interaction permission control based on at least both an enterprise role for the user in the enterprise and a dimensional coverage;

storing, in a local network entitlement database system, the user entitlements generated by the entitlement application server, wherein the local network entitlement database is in the local network;

resolving, by a local network Run-Time Access Control (RTAC) server a local network entitlement query for a first user in the enterprise from a local network application on the local network, wherein the local network RTAC server is for resolving the local network entitlement query based on the user entitlements stored in the local network entitlement database system;

storing, in a local network run time store (RTS) data store on the local network, user entitlement updates, wherein the user entitlement updates comprise updates to existing user entitlements and new user entitlements;

storing, in a cloud network database on a cloud network that is data communication with the local network, the user entitlements based on the user entitlement updates received from the local network RTS data store;

receiving, by a cloud network RTAC server, a cloud network entitlement query for a second user in the enterprise from a cloud application in data communication with the cloud network, wherein the cloud network entitlement query comprises a query from the cloud application as to whether the second user has permission to perform a function with respect to the cloud application;

in response to receiving the cloud network entitlement query, querying, by the cloud network RTAC server, the cloud network database for a user entitlement for the second user; and resolving, by the cloud network RTAC server, an entitlement outcome for the second user for the cloud application based on the user entitlement for the second user, wherein the entitlement outcome comprises a response to the cloud network entitlement query enforceable by the cloud application.

14. The method of claim 13, wherein resolving the entitlement outcome by the cloud network RTAC server comprises determining whether both the enterprise role and dimensional coverage are satisfied for the user.

15. The method of claim 13 wherein the user entitlements comprises at least one of defined access rights to resources, actions, restrictive coverages, or combinations thereof.

16. The method of claim 13, further comprising:
pushing the user entitlement updates to the cloud network database via a data pipeline.

* * * * *